(12) United States Patent
Stelzer

(10) Patent No.: US 10,185,135 B2
(45) Date of Patent: Jan. 22, 2019

(54) LENS WITH AT LEAST ONE OBJECT-SIDE AND AT LEAST ONE IMAGE-SIDE REFRACTIVE SURFACE

(71) Applicant: JABIL OPTICS GERMANY GMBH, Jena (DE)

(72) Inventor: Carsten Stelzer, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 0 days.

(21) Appl. No.: 15/422,301

(22) Filed: Feb. 1, 2017

(65) Prior Publication Data

US 2017/0146779 A1 May 25, 2017

Related U.S. Application Data

(63) Continuation of application No. 14/629,668, filed on Feb. 24, 2015, now Pat. No. 9,678,320.

(30) Foreign Application Priority Data

Feb. 25, 2014 (DE) ........................ 10 2014 203 324

(51) Int. Cl.
| | |
|---|---|
| *G02B 17/00* | (2006.01) |
| *G02B 17/08* | (2006.01) |
| *G01J 1/42* | (2006.01) |
| *G02B 3/00* | (2006.01) |
| *G02B 27/09* | (2006.01) |
| *G02B 27/10* | (2006.01) |

(Continued)

(52) U.S. Cl.
CPC .......... *G02B 17/086* (2013.01); *G01J 1/0204* (2013.01); *G01J 1/0407* (2013.01); *G01J 1/0411* (2013.01); *G01J 1/0414* (2013.01); *G01J 1/4257* (2013.01); *G02B 3/005* (2013.01); *G02B 3/0037* (2013.01); *G02B 3/0056* (2013.01); *G02B 3/0068* (2013.01); *G02B 13/0055* (2013.01); *G02B 17/002* (2013.01); *G02B 19/0028* (2013.01); *G02B 27/0961* (2013.01); *G02B 27/108* (2013.01); *G02B 27/126* (2013.01)

(58) Field of Classification Search
CPC .... G02B 27/108; G02B 27/10; G02B 27/126; G02B 27/0977; G02B 3/0056; G02B 17/002; G02B 17/086
USPC .......................................... 359/642, 726–736
See application file for complete search history.

(56) References Cited

U.S. PATENT DOCUMENTS

| 3,628,027 A | 12/1971 | Brauss |
| 5,473,474 A | 12/1995 | Powell |
(Continued)

FOREIGN PATENT DOCUMENTS

| CN | 101238396 A | 8/2008 |
| DE | 2928887 C2 | 11/1981 |
(Continued)

*Primary Examiner* — Darryl J Collins
(74) *Attorney, Agent, or Firm* — Volpe and Koenig, P.C.

(57) ABSTRACT

Described herein is a lens having at least one object-side and at least one image-side refractive surface. In order to determine a light intensity of an effective luminous flux propagating through the lens without the need for additional components for coupling light out, the lens includes a reflective surface arranged between the object-side and the image-side refractive surfaces and aligned obliquely to the optical axis.

14 Claims, 3 Drawing Sheets

(51) Int. Cl.
*G02B 27/12* (2006.01)
*G01J 1/04* (2006.01)
*G01J 1/02* (2006.01)
*G02B 13/00* (2006.01)
*G02B 19/00* (2006.01)

(56) References Cited

U.S. PATENT DOCUMENTS

| | | | |
|---|---|---|---|
| 5,907,438 | A | 5/1999 | Fujita et al. |
| 6,252,647 | B1 | 6/2001 | Shiraishi |
| 7,352,519 | B2 | 4/2008 | Vinogradov et al. |
| 8,456,744 | B2 | 6/2013 | Dobschal et al. |
| 9,678,320 | B2 * | 6/2017 | Stelzer .............. G02B 17/086 |
| 2002/0181122 | A1 | 12/2002 | Ludington |
| 2003/0053222 | A1 | 3/2003 | Togami et al. |
| 2010/0278480 | A1 | 11/2010 | Vasylyev |
| 2010/0321785 | A1 | 12/2010 | Wu et al. |
| 2011/0164227 | A1 | 7/2011 | Kim et al. |
| 2011/0267570 | A1 | 11/2011 | Saito et al. |
| 2012/0043476 | A1 | 2/2012 | Salmelainen |
| 2012/0106169 | A1 | 5/2012 | Kim et al. |
| 2013/0057971 | A1 | 3/2013 | Zhao et al. |
| 2013/0294045 | A1 | 11/2013 | Morgenbrod |

FOREIGN PATENT DOCUMENTS

| | | |
|---|---|---|
| DE | 102009010537 A1 | 8/2010 |
| DE | 102011002960 B3 | 4/2012 |
| EP | 0209108 A2 | 1/1987 |
| EP | 0683574 A1 | 11/1995 |
| EP | 2650704 A1 | 10/2013 |
| FR | 2569015 A1 | 2/1986 |
| GB | 2272980 A | 6/1994 |
| GB | 2289139 A | 11/1995 |
| WO | 9800747 A1 | 1/1998 |

* cited by examiner

LENS WITH AT LEAST ONE OBJECT-SIDE AND AT LEAST ONE IMAGE-SIDE REFRACTIVE SURFACE

CROSS REFERENCE TO RELATED APPLICATION

This application is a continuation of U.S. patent application Ser. No. 14/629,668, filed Feb. 24, 2015, which claims the benefit of German Patent Application No. 102014203324.1 filed on Feb. 25, 2014, which are incorporated by reference as if fully set forth.

FIELD OF INVENTION

The invention relates to a lens having at least one object-side and at least one image-side refractive surface.

BACKGROUND

Lenses of the aforementioned type are generally known and are widely used for imaging. However, frequently partial amounts of light from a luminous flux passing through the lens need to be coupled out during imaging, for example, to measure the light intensity of the luminous flux in imaging devices. Until now, partially transparent mirror were used for this purpose, which are arranged along the luminous flux before or after the lens. The use of the semi-transparent mirrors, however, requires additional space, which is limited especially for compact imaging devices.

SUMMARY

Described herein is a lens with which the light intensity can be measured in a simple and space-saving manner. In an embodiment, the lens has a reflective surface aligned obliquely to the optical axis of the lens, where the reflective surface is arranged between an object-side and image-side surface.

Light from the luminous flux incident in the lens is coupled out at the reflective surface by reflection, so that the luminous flux can only partially propagate through the image-side surface of the lens as an effective luminous flux. The light reflected at the reflective surface is thus reflected or extracted from the luminous flux without requiring additional optical components, such as partially transparent mirrors. Therefore, the lens according to the invention enables a compact design of imaging devices. Furthermore, there are no costs for additional optical components for coupling light out of the luminous flux. In addition, the lens couples the luminous flux out with an insignificant small susceptibility to tolerances, since the reflective surface is part of the lens and does not require alignment when assembling the imaging device.

The solution according to the invention can be further improved by various separately advantageous embodiments that can be combined in any number of ways. These embodiments and their associated advantages will be discussed below.

For example, the reflective surface may be formed to partially reflect light of the luminous flux incident in the lens on the object-side toward an edge region of the lens. The edge region of the lens may be configured such that the partial luminous flux reflected at the reflective surface can readily pass through the edge region of the lens.

For measuring the light intensity, an imaging device having the lens may be provided with a light intensity measuring device, wherein the light intensity measuring device is arranged, as viewed from the reflective surface, behind the edge region. Scattered light or part of the luminous flux passing through the lens does not interfere with the intensity measurement of the coupled-out partial luminous flux. The light intensity of the incident luminous flux and of the effective luminous flux can be derived from the light intensity of the partial luminous flux. Instead of or in addition to the measurement of light intensity, other parameters, such as the color or the color temperature of the partial luminous flux can be measured and suitable measuring devices may be provided instead of or in addition to the light intensity measuring device.

The edge region may be provided with or may consist of a decoupling surface. The decoupling surface is formed and for example coated, so that the partial luminous flux can pass through the decoupling surface and reach the measuring device without being appreciably reflected at the decoupling surface. The decoupling surface may also be designed as a refractive surface.

In particular, the reflective surface may be designed to reflect light incident in the lens parallel to the optical axis toward the edge region of the lens. The edge region of the lens may be aligned so that the light incident in the lens parallel to the optical axis is oriented perpendicular to the edge region after reflection at the reflective surface. The reflected partial luminous flux can thus be transmitted through the edge region with insignificant loss, wherein the light of the partial luminous flux is not significantly refracted or reflected.

The reflective surface may be planar, so that light incident in the lens parallel to the optical axis is reflected in form of a partial luminous flux having a substantially constant width. This simplifies the alignment of the partial luminous flux on the measuring device.

The reflective surface may be a reflective element disposed in the lens and for example molded with the lens, such as a mirror plate. In an embodiment, the reflective surface may however be formed by a surface of the lens. A reflective element provided with a reflective surface then no longer needs to be attached on or in the lens. Surfaces of the lens are usually not readily displaceable or rotatable with respect to other parts of the lens, so that the orientation of the reflective surface in relation to the optical axis of the lens is substantially invariable, so that the proportion of the light reflected out of the luminous flux and the alignment of the partial luminous flux can be kept constant.

The reflective surface may be designed to be reflective and for example be provided with a reflective layer, which may include aluminum. However, an angle between the reflective surface and the optical axis of the lens may be greater than the critical angle for total reflection. The angle may in particular be greater than the critical angle for total internal reflection of light entering the lens parallel to the optical axis on the object-side. Consequently, the light entering the lens with the luminous flux and incident on the reflective surface light can be essentially completely coupled out through the reflective surface as partial luminous flux, without allowing the light that passes through the reflective surface to illuminate undesired areas. A reflective layer does not need to be provided and e.g. to be attached.

The reflective surface may be arranged at a base of an opening extending into the lens. The opening may extend into the lens as a blind hole or as a groove. This arrangement may obviate the need for additional space for the elements protruding from and supporting the reflective surface which could create problems during assembly of the lens. The lens according to the invention can thus be easily mounted, without requiring additional space. Furthermore, the reflective surface can be formed easily through the opening or when the opening is introduced.

The opening may open away from the object-side surface, so that the light entering in the lens through the object-side surface may impinge on the reflective surface through the material of the lens where it can then be coupled out with low loss through total internal reflection like in a prism.

The opening may have a constant cross-section transversely to the optical axis, so that the lens may be easily provided with the opening and the reflective surface, for example, when the lens is formed. The opening may be formed by injection molding or pressing, and may have a circular, oval or polygonal, for example rectangular, cross section.

The opening may be formed so as to be closed transversely to the optical axis, i.e. completely surrounded by the material of the lens.

The opening may extend parallel to the optical axis, so as to minimally interact with parts of the incident luminous flux that does not impinge on the reflective surface during use of the lens.

In another embodiment, the lens may have a second reflective surface arranged between the object-side surface and the image-side surface. The two reflective surfaces may be arranged spaced apart transversely to the optical axis so that different regions or sections of the luminous flux impinge on the two reflective surfaces. Consequently, for example, light intensities of different sections of the luminous flux incident on the lens can then be measured. Accordingly, two partial luminous fluxes can be coupled out of the luminous flux by using the two reflective surfaces.

The two reflective surfaces may be disposed along the optical axis at different depths in the lens and may extend, for example, parallel to each other, so that the partial luminous fluxes propagate to the same edge region without any or an incomplete overlap. However, the reflective surfaces may be tilted in different and, for example, opposite directions in relation to the optical axis of the lens, so that the partial luminous fluxes propagate to different edge regions and extend, for example, away from each other and from the respective reflective surface to the nearest edge region. This may prevent the light intensity of one of the partial luminous fluxes from affecting another one of the partial luminous fluxes.

In particular, the lens may include a plurality of reflective surfaces arranged between the object-side refractive surface and the image-side refractive surface. For example, the lens may have three, four or even more reflective surfaces. These reflective surfaces may couple light out of the incident luminous flux in different directions or for example to different edge regions. Alternatively, the at least two reflective surfaces may be aligned to at least partially or completely overlap decoupled partial luminous fluxes, for example, at the edge region or outside of the lens.

A plurality of small reflective surfaces may reduce the homogeneity of the effective luminous flux less than individual reflective surfaces or even a single large reflective surface. Furthermore, the homogeneity of the effective luminous flux may be improved through a suitable arrangement of a plurality of small reflective surfaces. The required number of measuring instruments can be reduced when the partial luminous fluxes overlap.

The lens may, for example, be a condenser lens and especially a honeycomb condenser lens for homogenization of the luminous flux. The honeycomb condenser lens has several object-side and several image-side refracting surfaces, wherein the refractive surfaces may, for example, form juxtaposed micro-lenses arranged transverse to the optical axis.

The effective luminous flux of an imaging device can be homogenized by using the honeycomb condenser lens of the present invention, so that a variation of the light intensity in an effective luminous flux at a specific time differs from a set point value as small as possible. Furthermore, the light intensity of the effective luminous flux can also be measured with an imaging device based on the light intensity of the at least one partial luminous flux over long periods of time and the light intensity of the effective luminous flux may be controlled based on the measurement results, so as to keep the light intensity of the effective luminous flux substantially constant over time. The at least one reflective surface may only insignificantly affect the homogenization by the honeycomb condenser lens, if at all. A possible influence can be compensated by adjustments to the honeycomb condenser lens.

The size of the at least one reflective surface transverse to the optical axis may correspond to the size of a partial lens or a multiple of the size of a partial lens honeycomb condenser lens. Parallel to the optical axis, the at least one reflective surface may be arranged after at least one of the partial lenses of the honeycomb condenser lens and may even be aligned with the partial lens or a contiguous group of partial lenses.

BRIEF DESCRIPTION OF THE DRAWINGS

The invention will now be explained with reference to exemplary embodiments and with reference to the drawings. The different features of the embodiments can be combined independently, as has already been described for the individual embodiments.

The drawings show in.

DETAILED DESCRIPTION OF THE PREFERRED EMBODIMENTS

First, the structure and function of a lens according to the invention will be described with reference to the embodiment of FIG. 1.

Figure 1:
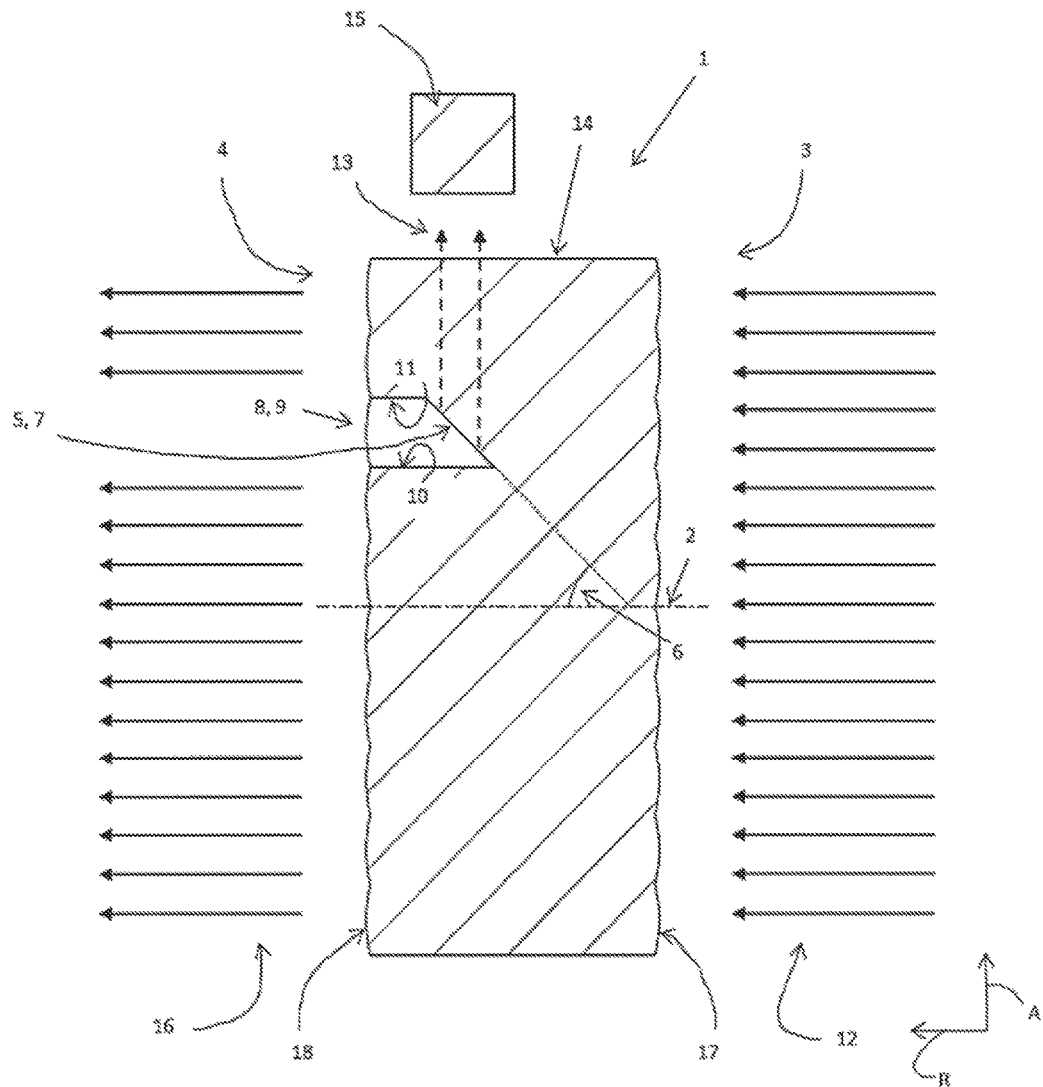
FIG. 1 a schematic representation of a first exemplary embodiment of a lens according to the invention in a sectional view.

FIG. 1 shows a lens 1 schematically in a sectional view. An optical axis 2 of the lens 1 runs in the sectional plane of the sectional view.

The lens 1 has an object-side side 3 and an image-side side 4, which are consecutively arranged parallel to the optical axis 2. The two sides 3, 4 may each have or consist of at least one refractive surface.

The lens 1 is provided with a reflective surface 5 disposed between the object-side side 3 and the image-side side 4, wherein the reflective surface 5 is oriented obliquely to the optical axis 2. An angle 6 between the optical axis 2 and the reflective surface 5 is preferably greater than the critical angle for total reflection of the light entering the lens 1, for example, through the object-side side 3 parallel to the optical axis 2.

The reflective surface 5 is arranged on the base 7 of an opening 8 extending into the lens 1, wherein the opening 8 opens away from the object-side side 3 of the lens 1. A through-opening 9 formed by the opening 8 is thus arranged in the image-side side 4. Side walls 10, 11 of the opening 8 preferably extend substantially parallel to the optical axis 2. Light incident in the lens 1, for example, parallel to the optical axis 2 is not at all or only insignificantly incident on the side walls 10, 11 and is thus not at all or only insignificantly reflected or refracted by the side walls 10, 11.

To illustrate the function of the lens 1, a luminous flux 12 is represented in FIG. 1 by a plurality of arrows, wherein the luminous flux 12 is incident in the lens 1 through the object-side side 3. The incident luminous flux 12 propagates through the lens 1 in a direction R and exits at least partially on the image-side side 4 of the lens 1. The direction R is parallel to the optical axis 2.

Along its path through the lens 1 in the direction R, a portion of the incident luminous flux 12 impinges on the reflective surface 5, wherein this portion is then coupled out of the incident luminous flux 12 as a partial luminous flux 13 and reflected by the reflective surface 5 obliquely or transversely with respect to the optical axis 2. In particular, the partial luminous flux 13 extends transversely to the optical axis 2 and is incident along its path on an edge region 14 of the lens 1. The partial luminous flux 13 propagates through the edge region 14 along a decoupling direction A, wherein the decoupling direction A is preferably oriented perpendicular to the edge region 14. As seen from the reflective surface 5 in the decoupling direction A, a measuring device 15 of an imaging device, for example for measuring the light intensity of the partial luminous flux 13, may be arranged behind the edge region 14. Conclusions about the incident luminous flux 12 can be drawn from the partial luminous flux 13 incident on the measuring device 15. In particular, conclusions about the light intensity of the incident luminous flux 12 can be drawn from the light intensity of the partial luminous flux 13.

An effective luminous flux 16 exits through the image-side side 4, which essentially corresponds to the incident luminous flux 12 minus the partial luminous flux 13. Conclusions about the light intensity of the effective luminous flux 16 can thus be drawn based on the light intensity of the partial luminous flux 13.

The lens 1 in FIG. 1 is shown as an exemplary honeycomb condenser lens, wherein the object-side side 3 has at least one and in particular a plurality of object-side refractive surfaces 17 and the image-side side 4 has at least one and in particular a plurality of image-side refractive surfaces 18. Honeycomb condenser lenses are used for homogenizing luminous fluxes. Due to the properties of the honeycomb condenser lens, the homogeneity of the effective luminous flux 16 is not significantly affected by providing the reflective surface 5 or the opening 8. Accordingly, the light intensity of the incident luminous flux 12 and thus the effective luminous flux 16 can be easily determined with the lens 1 according to the invention, without significantly reducing the homogeneity of the effective luminous flux 16.

Figure 2:
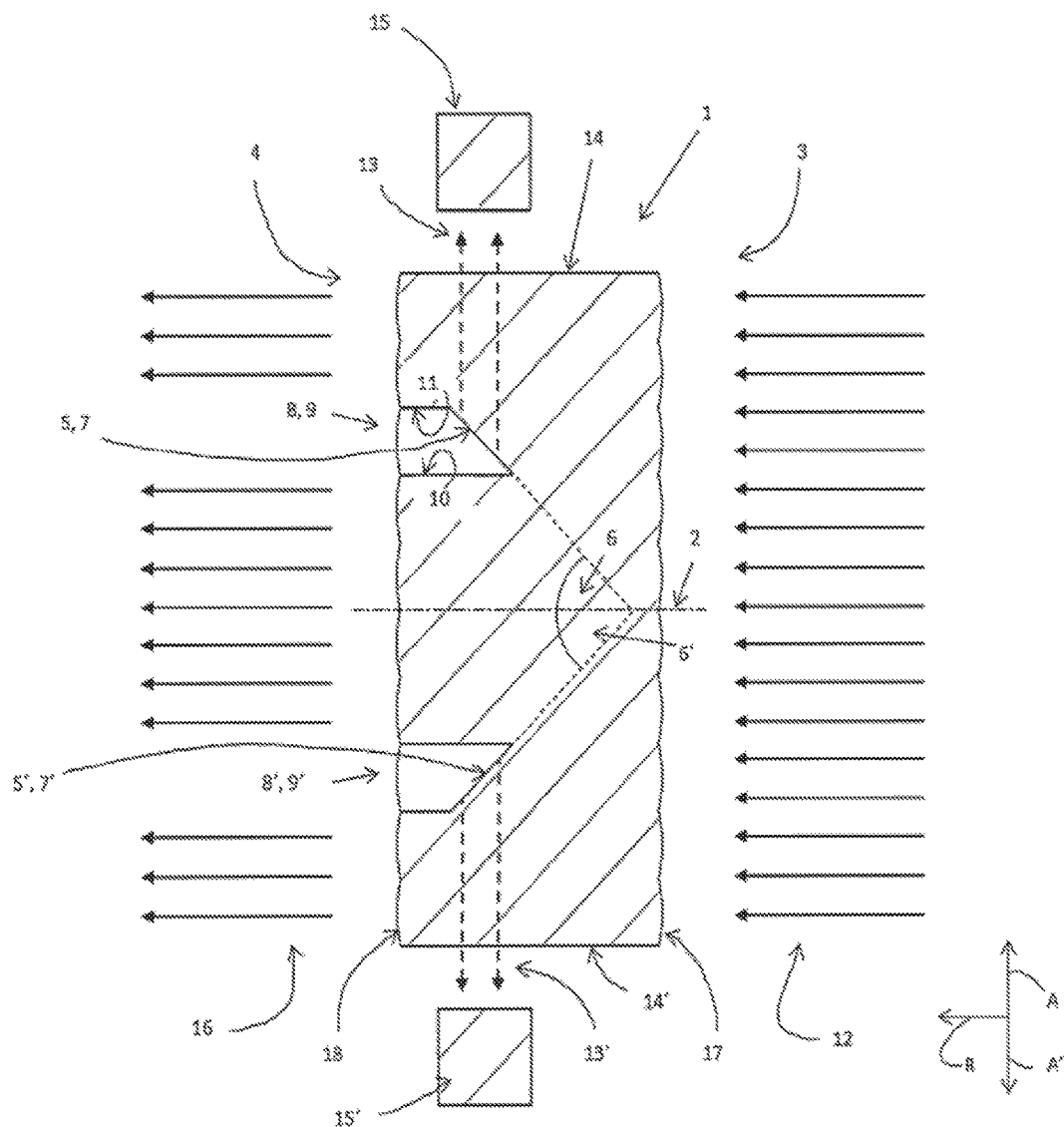
FIG. 2 a schematic representation of another exemplary embodiment of a lens according to the invention in a sectional view, and FIG. 3 a schematic representation of a further exemplary embodiment of a lens according to the invention in a perspective view.

FIG. 2 shows schematically in a sectional view another exemplary embodiment of the lens 1 according to the invention. The same reference symbols are used for elements that correspond functionally and/or structurally to the elements of the exemplary embodiment of FIG. 1. For brevity, only the differences to the embodiment of FIG. 1 will be described below.

The lens 1 of the exemplary embodiment of FIG. 2 is illustrated like the lens 1 of the exemplary embodiment of FIG. 1 as having the reflective surface 5, which is arranged for example at the base 7 of the opening 8. In addition, the lens 1 includes another reflective surface 5' which is spaced from the other reflective surface 5 transversely to the optical axis 2, for example, in the decoupling direction A. The other reflection face 5' may be arranged at a base 7' of another opening 8', wherein the two openings 8, 8' are open in the direction R and may have the same maximum depth opposite the direction R. The reflective surfaces 5, 5' can thus have the same spacing from the object-side side 3. In particular, the openings 8, 8' may be aligned with each other transversely to the optical axis 2, so that their projections completely overlap transversely to the optical axis 2.

The magnitude of the angle 6 between the reflective surface 5 and the optical axis 2 corresponds substantially to an angle 6' of the reflective surface 5 to the optical axis 2. However, the reflective surface 5' is preferably tilted in a different direction relative to the optical axis 2 from the reflective surface 5, and in particular in the opposite direction of the optical axis 2. The partial luminous flux coupled out by the reflective surface 5 thus propagates towards the edge region 14. A partial luminous flux 13' coupled out by the other reflective surface 5' is directed towards another edge region 14, which is located opposite the edge region 14. The partial luminous flux 13' thus extends from the other reflective surface 5' in a further decoupling direction A' to the other edge region 14', wherein the two coupling directions A, A' may be oriented in opposite directions.

The lens 1 of FIG. 2 is preferably also a honeycomb condenser lens so that decoupling of the partial luminous fluxes 13, 13' from the incident luminous flux 12 does not significantly diminish the homogeneity of the effective luminous flux 16.

Figure 3:
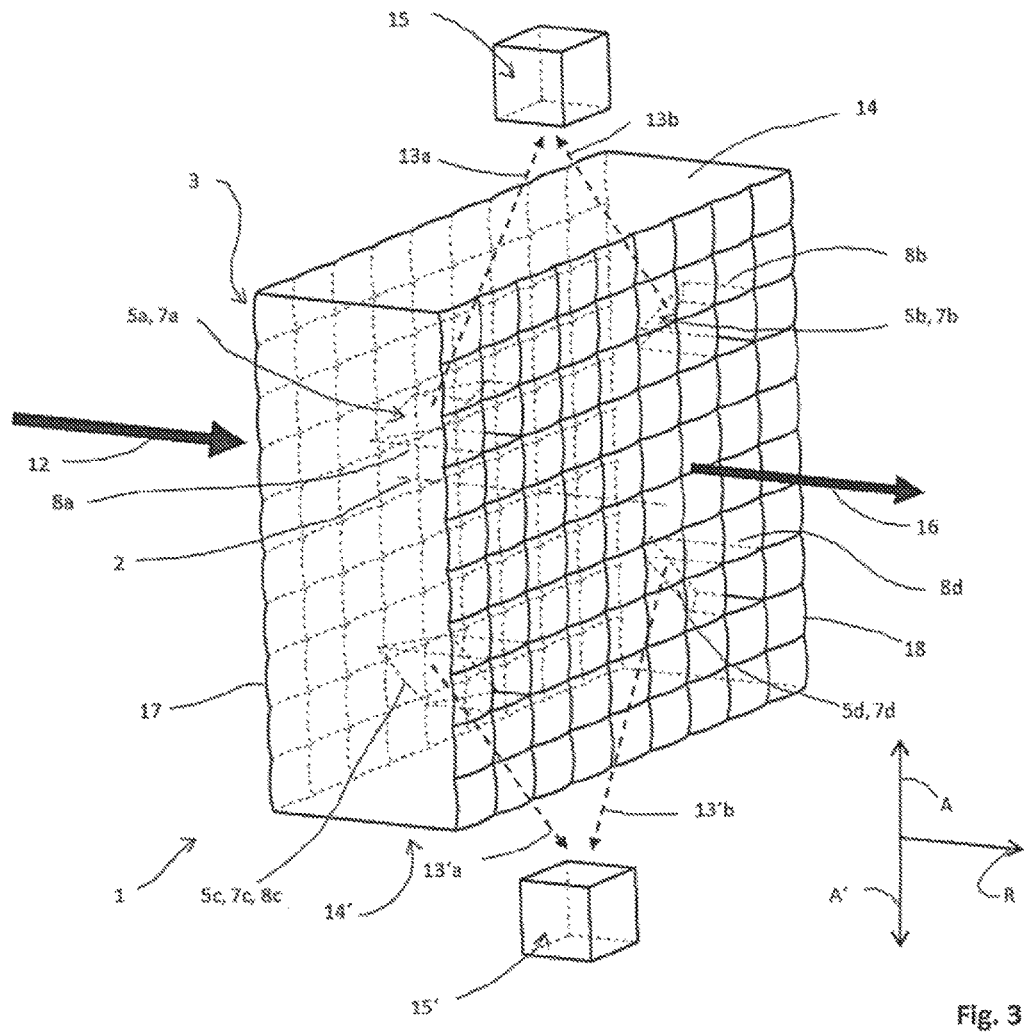

FIG. 3 shows schematically another exemplary embodiment of the lens 1 according to the invention in a perspective view. The same reference symbols are used for elements that correspond functionally and/or structurally to the elements of the previous exemplary embodiments. For sake of brevity, only the differences from the previous exemplary embodiments will be described below.

The lens 1 of FIG. 3 is formed as honeycomb condenser lens with a plurality of object-side and image-side light-refracting surfaces 17, 18. Opposing refractive surfaces 17, 18 arranged parallel to the optical axis 2 form a partial lens of the honeycomb condenser lens.

In contrast to the exemplary embodiment of FIG. 2, the lens 1 of the exemplary embodiment of FIG. 3 has more than two and in particular four reflective surfaces 5a, 5b, 5c, 5d. Each of the reflective surfaces 5a, 5b, 5c, 5d is in this example arranged at a base 7a, 7b, 7c, 7d of an opening 8a, 8b, 8c, 8d. Each of the openings 8a, 8b, 8c, 8d may extend parallel to the optical axis 2 and may open away from the object-side side 3 of the lens 1.

Two of the reflective surfaces, for example the reflective surfaces 5a, 5b, are arranged between the optical axis 2 and the edge region 14. The partial luminous fluxes 13a, 13b coupled out from the two reflective surfaces 5a, 5b overlap each other at least in the region of the measuring device 15 to be provided on or after the edge region 14, so that intensity variations of both partial luminous fluxes 13a, 13b can be determined by using the single measuring device 15.

The optionally provided other two reflective surfaces 5c, 5d are shown as being arranged between the optical axis 2 and the other edge region 14'. The reflective surfaces 5c, 5d are aligned so that coupled-out partial luminous fluxes 13'a, 13'b overlap in the region of the additional measuring device 15' to be provided on or after the additional edge region 14'.

If the measuring device 15, 15' abuts the edge region 14, 14', then the partial luminous fluxes 13a, 13b or 13'a, 13'b can overlap in the region of the edge regions 14, 14'. In particular, the partial luminous fluxes may overlap completely to ensure that the respective measuring device 15, 15' receives equal proportions of the partial luminous fluxes 13a, 13b or 13'a, 13'b.

As an alternative to the embodiment of FIG. 3, the reflective surfaces 5a, 5b, 5c, 5d may be aligned so that the partial luminous fluxes 13a, 13b, 13'a, 13'b do not overlap and, for example, each of the partial luminous fluxes 13a, 13b, 13'a, 13'b is directed to a corresponding edge region of the lens 1.

The lens described herein may be incorporated in many devices, for example including but not limited to, imaging devices, imagers or the like.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A honeycomb condenser lens, comprising:
a plurality of object-side refractive surfaces and a plurality of image-side refractive surfaces, the object-side refractive surfaces and corresponding image-side refractive surfaces respectively forming partial lenses of the honeycomb condenser lens; and
a reflective surface oriented obliquely to an optical axis of the honeycomb condenser lens,
wherein the reflective surface is arranged between the plurality of object-side refractive surfaces and the plurality of image-side refractive surfaces of the honeycomb lens, and
wherein the size of the reflective surface transverse to the optical axis corresponds to the size of one of the partial lenses or a multiple of the size of one of the partial lenses.

2. The honeycomb condenser lens according to claim 1, wherein the reflective surface is planar.

3. The honeycomb condenser lens according to claim 1, wherein the reflective surface is formed by a surface of the honeycomb condenser lens.

4. The honeycomb condenser lens according to claim 1, wherein an angle between the reflective surface and the optical axis of the honeycomb condenser lens is greater than the critical angle for total reflection of light entering the honeycomb condenser lens parallel to the optical axis on the plurality of object-side refractive surfaces.

5. The honeycomb condenser lens according to claim 4, wherein an opening opens away from the plurality of object-side refractive surfaces.

6. The honeycomb condenser lens according to claim 1, wherein the honeycomb condenser lens comprises a plurality of reflective surfaces arranged between the plurality of object-side refractive surfaces and the plurality of image-side refractive surfaces.

7. The honeycomb condenser lens according to claim 6, wherein the reflective surfaces are tilted in different directions with respect to the optical axis of the honeycomb condenser lens.

8. A device, comprising:
a honeycomb condenser lens;
the honeycomb condenser lens including a plurality of object-side refractive surfaces and a plurality of image-side refractive surfaces, the object-side refractive surfaces and corresponding image-side refractive surfaces respectively forming partial lenses of the honeycomb condenser lens; and
the honeycomb condenser lens including a reflective surface oriented obliquely to an optical axis of the honeycomb condenser lens,
wherein the reflective surface is arranged between the plurality of object-side refractive surfaces and the plurality of image-side refractive surfaces of the honeycomb lens, and
wherein the size of the reflective surface transverse to the optical axis corresponds to the size of one of the partial lenses or a multiple of the size of one of the partial lens.

9. The device according to claim 8, wherein the reflective surface is planar.

10. The device according to claim 8, wherein the reflective surface is formed by a surface of the honeycomb condenser lens.

11. The device according to claim 8, wherein an angle between the reflective surface and the optical axis of the honeycomb condenser lens is greater than the critical angle for total reflection of light entering the honeycomb condenser lens parallel to the optical axis on the plurality of object-side refractive surfaces.

12. The device according to claim 11, wherein an opening opens away from the plurality of object-side refractive surfaces.

13. The device according to claim 8, wherein the honeycomb condenser lens comprises a plurality of reflective surfaces arranged between the plurality of object-side refractive surfaces and the plurality of image-side refractive surfaces.

14. The device according to claim 13, wherein the reflective surfaces are tilted in different directions with respect to the optical axis of the honeycomb condenser lens.

* * * * *